(12) United States Patent
Wilkins et al.

(10) Patent No.: US 7,404,021 B2
(45) Date of Patent: Jul. 22, 2008

(54) INTEGRATED INPUT/OUTPUT CONTROLLER

(75) Inventors: Virgil Wilkins, Perris, CA (US); Robert Horn, Yorba Linda, CA (US); Marc Acosta, San Clemente, CA (US); Sanjay Mathur, Laguna Hills, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 385 days.

(21) Appl. No.: 10/912,157

(22) Filed: Aug. 6, 2004

(65) Prior Publication Data

US 2005/0050240 A1    Mar. 3, 2005

Related U.S. Application Data

(63) Continuation of application No. 09/716,195, filed on Nov. 17, 2000, now abandoned.

(51) Int. Cl.
*G06F 13/00* (2006.01)
*G06F 3/00* (2006.01)
*G06F 12/00* (2006.01)
*G06F 13/38* (2006.01)

(52) U.S. Cl. ............... 710/74; 710/1; 710/5; 710/7; 710/62; 710/63; 710/64; 711/100; 711/111; 711/112; 711/114; 711/202; 711/203

(58) Field of Classification Search ............... None
See application file for complete search history.

(56) References Cited

U.S. PATENT DOCUMENTS

| | | | |
|---|---|---|---|
| 5,249,279 A * | 9/1993 | Schmenk et al. ............... 710/5 |
| 5,345,565 A | 9/1994 | Jibbe et al. |
| 5,455,934 A | 10/1995 | Holland et al. |
| 5,485,595 A | 1/1996 | Assar et al. |
| 5,608,891 A * | 3/1997 | Mizuno et al. ............... 711/114 |
| 5,696,931 A * | 12/1997 | Lum et al. ............... 711/113 |
| 5,754,756 A * | 5/1998 | Watanabe et al. ............... 714/6 |
| 5,761,705 A | 6/1998 | DeKoning et al. |
| 5,809,285 A * | 9/1998 | Hilland ............... 703/25 |
| 5,884,098 A | 3/1999 | Mason, Jr. |
| 5,890,209 A | 3/1999 | Dobbek |
| 5,893,138 A * | 4/1999 | Judd et al. ............... 711/114 |
| 6,029,226 A | 2/2000 | Ellis et al. |
| 6,065,096 A | 5/2000 | Day et al. |
| 6,076,137 A | 6/2000 | Asnaashari |
| 6,094,699 A | 7/2000 | Surugucchi et al. |

(Continued)

OTHER PUBLICATIONS

Stallings, "Chapter 5, External Memory, Computer Organization and Architecture" 1996; pp. 155-169, Prentice Hall.

(Continued)

*Primary Examiner*—Tanh Q Nguyen
(74) *Attorney, Agent, or Firm*—Dickstein Shapiro LLP

(57) ABSTRACT

An integrated I/O controller in an integrated circuit is provided for centralized data management. The integrated circuit includes a host interface, a disk interface, and a mapping controller implemented in hardware to speed data processing and provide fault tolerance as exemplified with RAID configurations. The mapping controller provides block mapping across a plurality of peripherals or disk drives in a disk array. The integrated I/O controller can be utilized in storage area network systems and network area storage systems as well as other networking systems or devices.

41 Claims, 7 Drawing Sheets

U.S. PATENT DOCUMENTS 6,467,014 B1 10/2002 Bolt
6,693,754 B2 2/2004 Noble et al.
6,842,784 B1 * 1/2005 Black .......................... 709/225

OTHER PUBLICATIONS

"What is a Storage Area Network?" 2000; pp. 4-13, Legato Systems, Inc.

Massiglia, "RAID for Enterprise Computing", Jan. 2000; pp. 5-45; Veritas Software Corporation.

Clark, "Designing Storage Area Networks", 1999; pp. 7-123 & 171-177; Addison Wesley.

* cited by examiner

Fig 2 Integrated I/O Controller PCBA Diagram ized input/output requests and more particularly to input/output controllers to interface with an array of electronic devices such as computers, servers, networks, storage devices and the like.

INTEGRATED INPUT/OUTPUT CONTROLLER

This is a continuation of Ser. No. 09/716,195, filed Nov. 17, 2000, now abandoned.

BACKGROUND OF THE INVENTION

1. Field of the Invention

The present invention relates generally to concurrent processing and mapping of multiple input/output requests and more particularly to input/output controllers to interface with an array of electronic devices such as computers, servers, networks, storage devices and the like.

2. Background Information

Low-level control of a single disk drive to store data on one or more spinning magnetic disks is well known. Usually a dedicated disk drive controller performs the low level control of moving the read/write heads to the appropriate track and sector to read, write, or format the spinning magnetic disks.

High-level control of a single disk drive is typically provided by software such as a software driver that interfaces the disk drive to a particular operating system of a computer. Another type of high-level control of a single disk drive is partitioning software that partitions a single disk drive into multiple volumes of storage areas.

Another type of high-level control for multiple disk drives is redundant array of individual disks (RAID) software that is used to provide redundancy and increase reliability of the storage of data when multiple disks are available. Different levels of RAID software are available including RAID 0, RAID 1 and RAID 5, which provide different mechanisms of redundancy and reliability depending upon the system level requirements.

As the amount of data to be stored has become greater and the number of users requiring access to data has become larger, it has become a greater challenge to manage data storage. To ease data storage management, such as data backup and disaster recovery, it has become desirable to centralize data storage to a common pool of disks. The centralized data storage can be made available to multiple users over a network. Furthermore with the advent of the internet, centralized data storage provides increased data availability to a broader and larger distribution of users.

Because the amount of data has grown and the number of users requiring access to centralized data storage has increased, the high level control of multiple disk drives by software alone has become disadvantageous. A main disadvantage to high-level control by software is that it is slow and creates a performance bottleneck in the flow of data into and out of the multiple array of disk drives.

It is desirable to overcome the disadvantages of the prior art.

BRIEF DESCRIPTION OF THE DRAWINGS

The features and advantages of the present invention will become apparent from the following detailed description of the present invention in which.

Like reference numbers and designations in the drawings indicate like elements providing similar functionality.

BRIEF SUMMARY OF THE INVENTION

Figure 1:
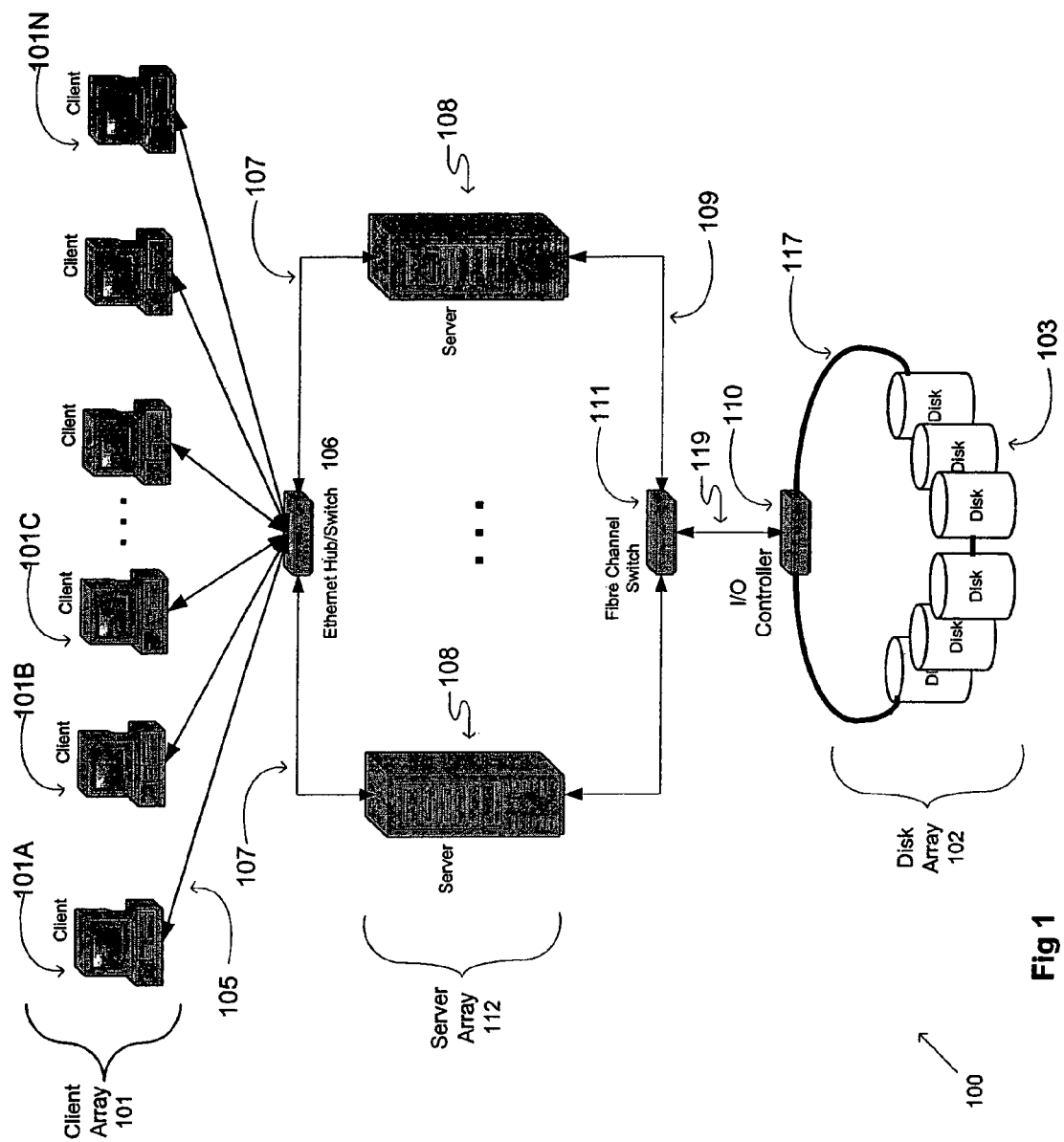
FIG. 1 is a system block diagram in which the present invention is utilized.

The present invention is briefly summarized by the claims that follow below.

DETAILED DESCRIPTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

The integrated I/O controller of the present invention integrates host and peripheral connections (such as disk or tape), media protocol controllers (such as Fiber channel, Ethernet or Infiniband protocol management), caching and buffer management hardware, block request mapping algorithms, packet management utilities and an embedded microcontroller. The integrated I/O controller performs resource workload balancing by monitoring a set of operational parameters and routing block level requests to the most appropriate resource. For example, two disk drives may both be able to satisfy the current data request. The integrated I/O controller will dispatch the command to the drive most likely to respond to the request in the least amount of time based upon the monitored parameters. The integrated I/O controller also provides improved fault tolerance through its integration and reliability as well as its layers of management. The integrated I/O controller provides high-level control of a plurality of disks using hardware circuits in order to increase control efficiency and processing speeds. This high level control of the plurality of disks is integrated into one semiconductor integrated circuit. High-level I/O commands from the server are parsed by the integrated I/O controller and then mapped and routed to the appropriate peripheral (disk, tape, optical drive) in the array of peripherals available to the server. The subsequent data is then routed to/from the Server from/to the designated peripheral by the integrated I/O controller.

In a RAID implementation the integrated I/O controller makes the array of physical disk drives transparent to the server. The array of physical disk drives are grouped together to form larger Logical disk drives and are referenced by the Server as Volumes via a Logical Unit Number (LUN). Algorithms for RAID mapping are executed by the integrated I/O controller for managing data accesses to the Volumes. The integrated I/O controller uses microcoded structures and state machines operating concurrently in much of its circuitry, as opposed to firmware and software that operates sequentially. The microcoded structures and state machines used in the present invention achieve increased performance while maintaining operational flexibility. A large local buffer is implemented to support the buffering of requested data blocks as well as cached data blocks yet to be requested by the Server or data blocks yet to be written to the physical disks.

Referring now to FIG. 1, a system block diagram of a simple storage area network 100 is illustrated. The storage area network 100 is exemplary of a system in which the integrated I/O controller of the present invention is utilized and can be a local area network (LAN), a metropolitan area network (MAN) or a wide area network (WAN). In the storage area network 100, a client array 101 of clients 101A-101N read and write data to at least one disk array 102 having a plurality of disks 103. Between the client array 101 and the disk array 102 resides an I/O controller 110 with RAID functionality to provide centralized data storage and centralized data storage management for the network 100.

In order to access the plurality of disks 103, the clients 101A-101N of the client array 101 are coupled to a network. The clients 101A-101N couple to a hub/switch 106 via cabling or connection 105. One or more servers 108 of a server array 112 couple to the hub/switch 106 as part of the network via cable or other type of network connection 107. In one embodiment, the hub/switch 106 is an Ethernet switch and the network 100 an Ethernet network. The cabling or connection 105 is usually Ethernet. The one or more servers 108 can include the I/O controller 110. Alternatively the one or more servers 108 can couple through cabling or connection 109 to a Fibre Channel switch 111 and then the I/O controller 110 through cabling or host connection 119 utilizing either Fibre Channel, Ethernet or Infiniband as the protocol for communication. When the switch 111 is utilized to connect the one or more servers 108 to the I/O controller 110, the term Fabric is used to describe this storage-area network topology. The I/O controller 110 couples to the plurality of disks 103 and associated disk array 102 by way of cabling or connection 117. The cabling or connection 117 is usually Fibre Channel Arbitrated Loop, but can also be parallel SCSI or Infiniband. The cabling or connection 117 is also referred to herein as the physical media connection interface 117. The plurality of disks 103 maybe optical disks, magnetic disks, semi-magnetic disks, tape drives or other data storage devices. The clients 101A-101N of the client array 101 in one embodiment are personal computers but can be other electronic or electrical devices coupled into a network configuration for storing and accessing data from the plurality of disks 103.

Figure 2:
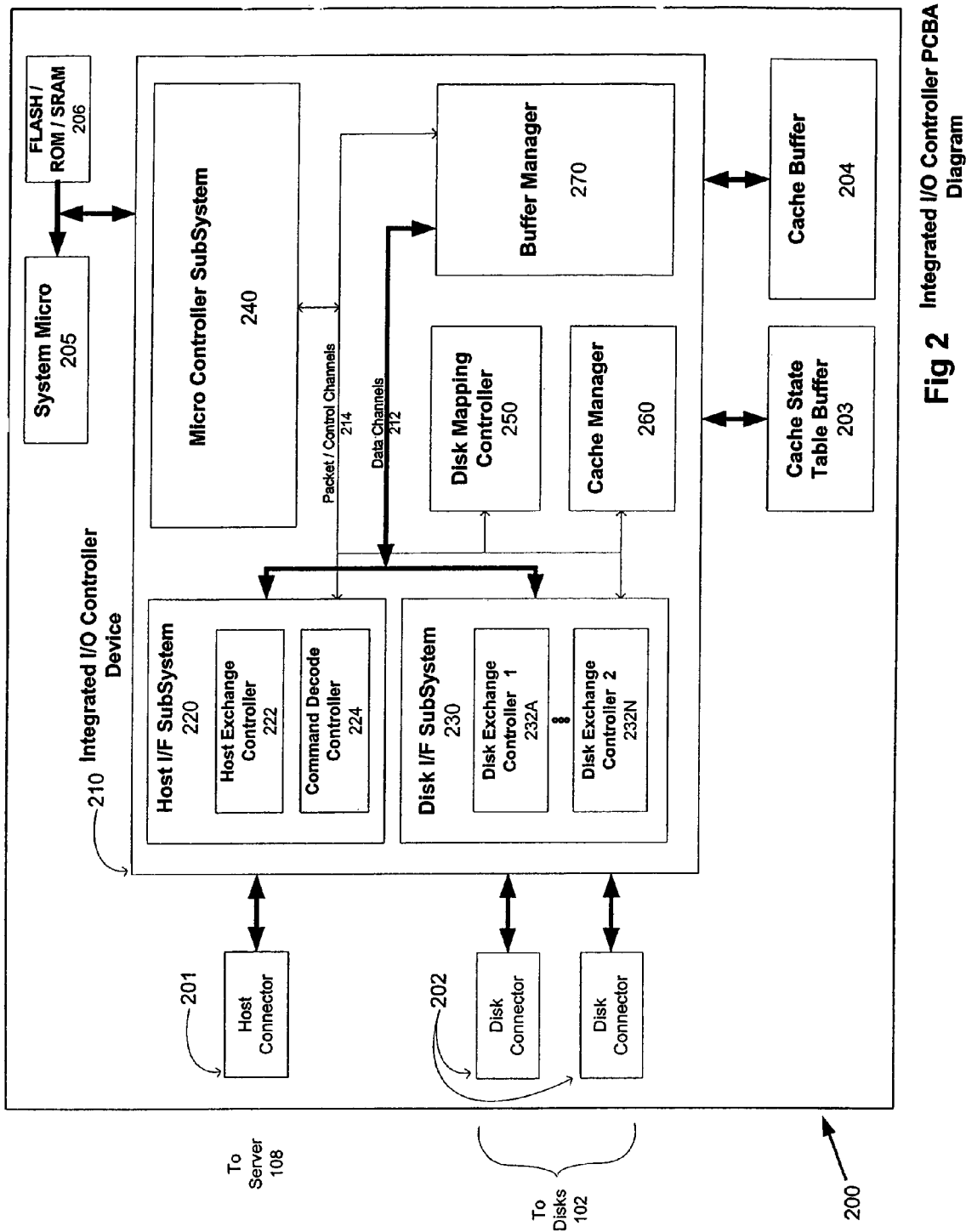
FIG. 2 is a functional block diagram of an embodiment of the present invention.

Referring now to FIG. 2, a functional diagram of a printed circuit board (PCB) 200 containing an integrated I/O controller device 210 of the present invention is illustrated. The I/O controller system 110 includes the PCB 200. As illustrated in FIG. 2, the PCB 200 includes the integrated I/O controller device 210, a host connector 201, at least one or more disk connectors 202, a cache buffer memory 204, a cache state table buffer memory 203, a system micro-processor 205, and program memory (such as FLASH, ROM, and SRAM) 206 for storing the microprocessor program, configuration tables and other program structures. The integrated I/O controller device 210, a single silicon integrated circuit, couples to the components of the printed circuit board 200 as shown in FIG. 2. The host connector 201 is for coupling the I/O controller device 210 to one or more servers 108 of the server array 112 via the network switch 111. The plurality of disk connectors 202 are for coupling the integrated I/O controller device 210 to at least one disk array 102 having the plurality of disks 103. The cache buffer 204 provides temporary storage for all data blocks transferred to/from the plurality of Servers 112 and the plurality of disks 103. The cache state table buffer memory 203 is utilized to maintain status of each block of data retained in the cache buffer memory 204. The microprocessor 205 and program memory 206 are utilized to assist the integrated I/O controller device 210 in its initialization and configuration of the storage or disk array 102 for access of data to the plurality of disks 103.

FIG. 2 also illustrates a functional block diagram of the integrated I/O controller device 210 which includes a host interface sub-system 220, a disk interface subsystem 230, a buffer manager 270, a cache manager 260, a disk mapping controller 250 and a micro-controller subsystem 240. The micro-controller subsystem 240 is coupled together with the host interface subsystem 220 and the disk interface subsystem 230 via the packet/control bus 214 to perform initialization and error handling at these interfaces. The micro-controller subsystem 240 is also coupled together with the buffer manager 270, the cache manager 260, and the disk mapping controller 250 in order to control the flow of non-user data information from the plurality of servers 108 of the server array 112 and the plurality of disks 103 of the disk array 102.

The buffer manager 270 couples to the cache buffer memory 204. The buffer manager 270 additionally couples to the disk interface subsystem 230 and the host interface subsystem 220 by way of data channels 212 for the transfer of data to/from the buffer memory 204 from/to a host server 108 or a disk 103 of the disk array. The buffer manager 270 uses traditional arbitration methods to arbitrate between multiple concurrent access requests from/to the host interface subsystem 220, disk interface subsystem 230 and micro controller subsystem 240 to/from the cache buffer memory 204.

The cache manager 260 couples to the cache state table buffer 203 of the cache memory and manages the coherency of data blocks in the cache buffer memory 204. The cache memory for the cache buffer memory 204 and the cache state table buffer 203 may be a dynamic random access memory or other type of memory. Additionally, the cache buffer memory 204 and cache state table buffer 203 could be integrated into the integrated I/O controller device 210 but it is preferable that it be external in order to provide system flexibility.

The host interface subsystem 220 of the integrated I/O controller device 210 includes a Host Exchange Controller (HEC) 222 and a Command Decode Controller (CDC) 224. The host exchange controller 222 controls the physical connection and protocol between the one or more servers 108 of the server array 112 and the integrated I/O controller device 210. This host connection or attachment 119 to the servers 108 can be Fibre Channel, Ethernet, PCI, PCI-X or Infiniband in alternate embodiments. The command decode controller 224 parses all commands received from the one or more servers 108 of the server array 112 and extracts the data block level read, write requests while routing all other commands to the micro controller subsystem 240. All commands over the host connection are preferably in the form of the Small Computer System Interface (SCSI) Command Descriptor Block (CDB) standard.

The disk interface subsystem 230 controls the connections between the plurality of disks 103 of the disk array 102 and the integrated I/O controller device 210 and includes one or more Disk Exchange Controllers 232A-232N. A preferred embodiment of the disk interface subsystem executes the industry standard fibre channel connection protocol (FC-AL, FC-AL2 or FC-AL3) on a physical level. To send and receive commands and data with the plurality of disks 103, the integrated I/O controller device 210 uses the SCSI over Fibre Channel protocol (such as FCP, FCP2 or SCSI-3).

The micro-controller subsystem 240 handles non-data flow commands, error and exception handling events as well as system initialization.

Figure 3:
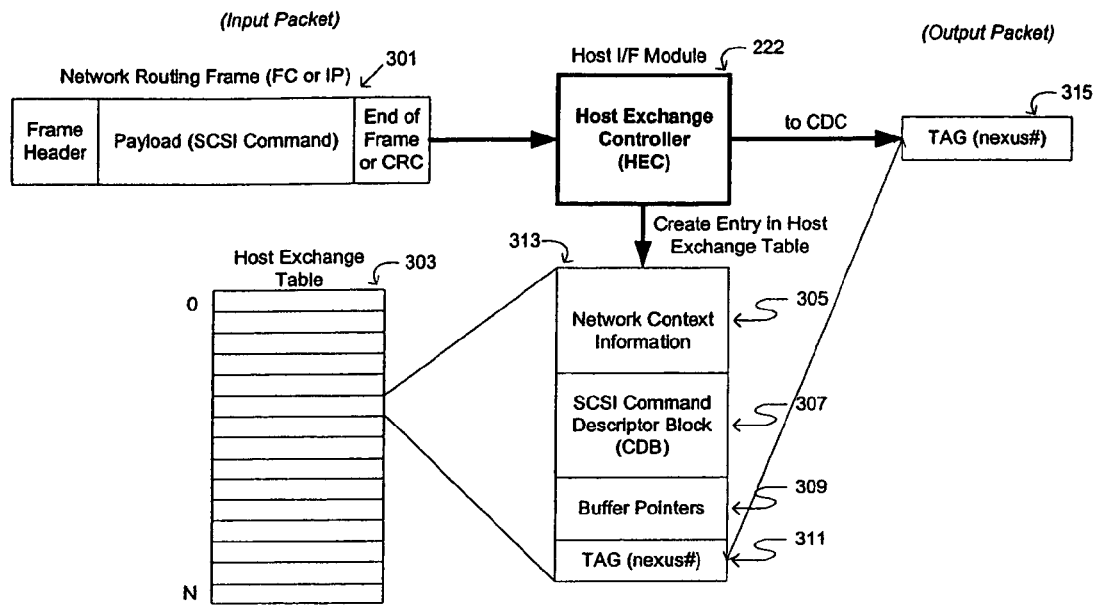
FIG. 3 is a process diagram of a Host Interface subsystem of the present invention illustrating input and output packets and tables utilized by a Host Exchange Controller of the Host Interface subsystem.

Referring now to FIG. 3, a process diagram of the Host Exchange Controller (HEC) 222 is illustrated. The host exchange controller 222 receives command and data frames from the physical media interface (Fibre Channel, Ethernet, Infiniband). Data frames received by the host exchange controller 222 are routed to the buffer manager 270 over the data channels 212. The command frames received by the host exchange controller 222, such as command frames 301 illustrated in FIG. 3, are stored as command entries into a host exchange table 303. The host exchange table 303 in one embodiment can hold thousands of command entries.

Each command entry 313 in the host exchange table 303 has a tag number 311 which is either assigned or implied. In one embodiment, the tag number 311 is the same as the entry number, (i.e., the physical position of the entry), in the host exchange table 303. The physical location of the command entry in the host exchange table 303 implies the tag number and thus an actual tag number field 311 need not be stored with each entry.

Each entry 313 in the host exchange table also includes several other fields to properly track the progress of the command through the integrated I/O controller device 210 and subsequently transfer data blocks to/from the requesting server 108. Field 305 contains network context information about the command which includes the Servers address on the network so response data can be routed properly back to the requesting server. Field 307 contains the SCSI CDB. Field 309 contains buffer pointers to physical locations in the cache buffer 204 where the data will be stored. The Cache Manager 260 assigns the proper values and stores them in field 309 of each entry 313 when the buffer space is physically allocated. Field 311 represents the unique tag number associated with this host exchange entry 313.

After the host exchange controller 222 creates the command entry 313 for a received command packet 301, a tag packet 315 containing the tag number for the received command is formed by the host exchange controller. The tag packet 315 is then sent to the Command Decode Controller 224 of host interface subsystem 220.

Figure 4:
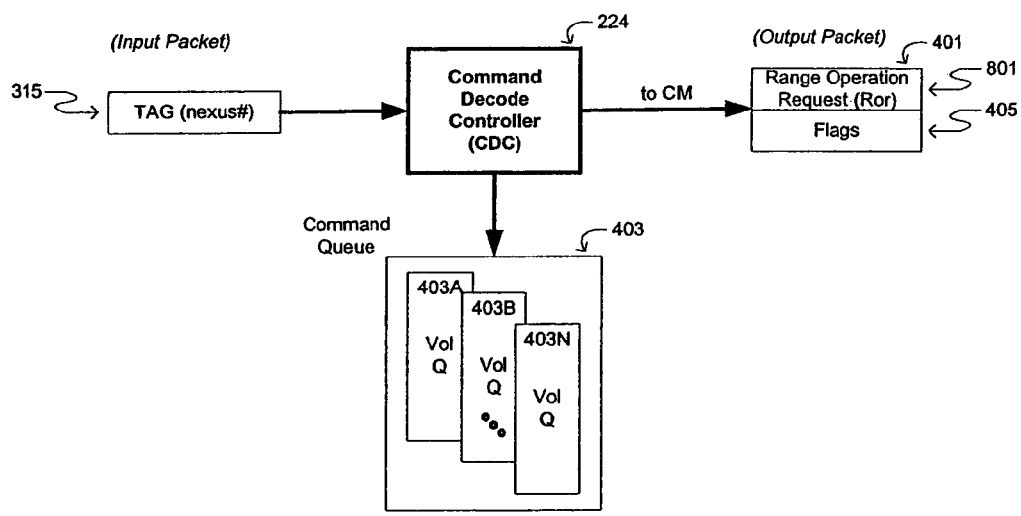
FIG. 4 is a process diagram for the Host Interface subsystem of the present invention illustrating input and output packets utilized by a Command Decode controller of the Host Interface subsystem.

Referring now to FIG. 4, a process diagram for the Command Decode Controller 224 is illustrated. The command decode controller 224 receives the tag packets 315 including the tag numbers pointing to SCSI CDBs' that need further processing. When its ready to process the next command, the command decode controller 224 reads the command entry 313 associated with a tag packet 315, extracts the SCSI CDB from it, and validates the contents of the command entry. The command decode controller 224 includes hardware circuitry and a microcoded state-machine that specializes in decoding and queuing dataflow requests, such as block read and write commands. All commands which are received by the command decode controller 224 and determined to be valid, are placed into a pool or table of command queues 403. A separate command queue 403A-403N is maintained in the pool or table of command queues 403 for each volume of the disk array 112 that is accessible to the server array 112. The command decode controller 224 implements the industry defined SCSI Architectural Model (SAM) for command processing, including command ordering and queuing. If implemented as a RAID controller, the command decode controller 224 translates the Logical Block Address (LBA) of the requested volume into a Global (or generic) logical block address (GLBA) understood by other circuitry in the integrated I/O controller device 210. This GLBA along with a sector count from the SCSI CDB, the direction of the requested transfer (read or write), and tag number 311 are combined together to form a Range Operation Request (Ror) 801 which is further described below and illustrated in FIG. 8. The Ror 801 is combined with a flag field 405 to form an output packet 401 from the command decode controller 224 which is sent to the Cache Manager 260. In one embodiment of the invention the flag field 405 includes information about the source of the packet as well as routing information defining the destination or recipient of the packet. The flag field 405 can be expanded to include additional information about the process state of the command entry 313 to assist the micro-controller subsystem 240 in the event of an error condition or in the development and debug of the integrated I/O controller device 210. Any task management function required by an incoming host command, such as a request for the capabilities and configuration of the integrated I/O controller via SCSI Mode pages, is routed by the command decode controller 224 to the micro-controller subsystem 240.

Figure 8:
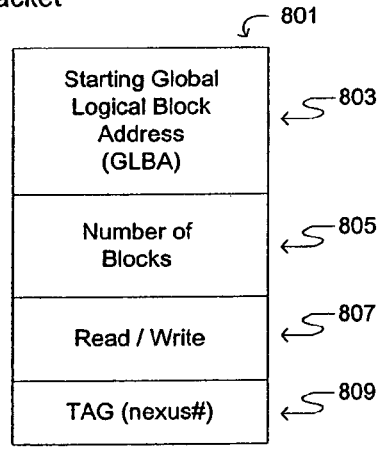
FIG. 8 is a block diagram illustrating fields of a Range Operation Request packet utilized in the present invention.

Referring now to FIG. 8, the format of the Range Operation request (Ror) packet 801 is illustrated. The Ror packet 801 is used to communicate command requests between functional blocks of the integrated I/O controller device 210. The Ror packet 801 includes a field 803, a field 805, a field 807 and a field 809. Field 803 contains the starting GLBA for the range of blocks to be operated upon. Field 805 of the Ror 801 contains the number of blocks to be operated upon (range) which depends upon if the Ror is generated by the cache manager 260, the command decode controller 224 or another functional blocks of the integrated I/O controller device 210. If the command is generated by the command decode controller 224, the value of the range (i.e. number of blocks to be operated upon) is generated from the sector count of the SCSI CDB. If the command is generated by the Cache Manager 260, the value of the range (i.e. number of blocks to be operated upon) represents the number of blocks in the cache buffer 204 to which access is desired in order to read or write data blocks to/from the disk array 102 and the plurality of drives 103. Field 807 indicates the type of range operation being requested, either a Read data operation or a Write data operation. Field 809 contains the tag number 311 from which the given Ror 801 is derived or associated.

Figure 5:
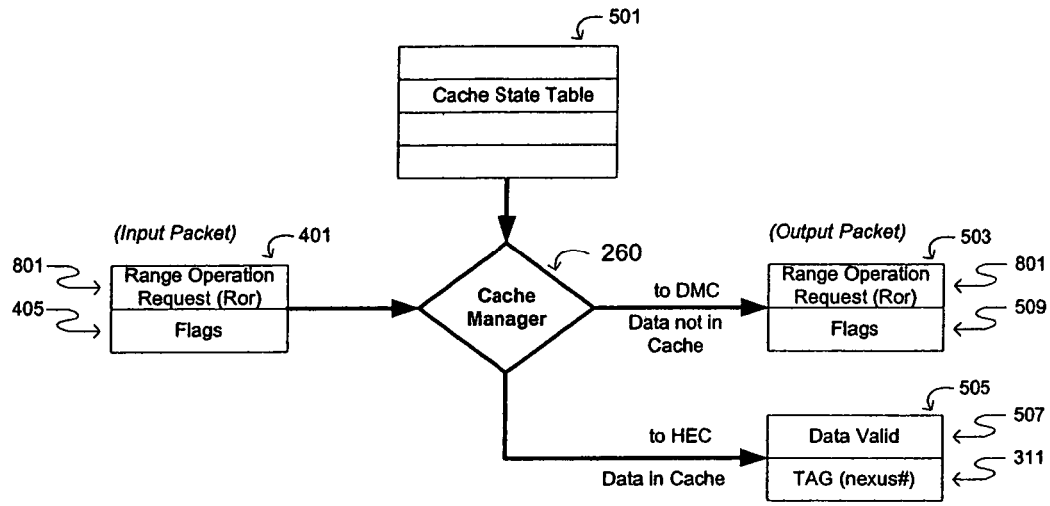
FIG. 5 is a process diagram of a Cache Manager of the present invention illustrating the input and output packets and tables utilized by the Cache Manager.

Referring now to FIG. 5, a process diagram for the Cache Manager 260 is illustrated. The cache manager 260 manages the state of all blocks within the cache buffer memory 204. The cache manager receives an input packet 401 including an Ror packet 801 and flags 405. The Ror 801 is extracted from the input packet 401 by the cache manager 260 and the range field 805 is read. The cache state buffer 203 includes a cache state table 501 which has entries each being associated with the data blocks stored into the cache buffer 204. The cache manager 260 then searches the entries in the cache state table 501 to determine if there are blocks of data in the cache buffer 204 which overlap the range of blocks specified by the range field 805 in the Ror 801. In the case of a read request, if the range of blocks requested by the command exists in the cache buffer 204 (i.e., a cache hit), the cache manager 260 updates the buffer pointer field 309 of the respective command entry 313 associated with this Ror 801 and then generates a response packet 505 which is sent to the host exchange controller 222. The response packet 505 includes a data valid field 507 indicating that data is valid and ready for transfer from the cache buffer 204 and the tag number 311. If the requested range of blocks is not detected in the cache buffer 204 for either a read or write request (i.e., a cache miss), the cache manager allocates buffer space in the cache buffer 204, updates the buffer pointers 309 in the host exchange entry 313 accordingly, and generates an output packet 503 including a new Ror 801 indicating the range of blocks required to satisfy the original range request of packet 401. The output packet 503 is passed to the disk mapping controller 250 for further processing to gain access to the disk array 112 because the desired data blocks were not in the cache buffer 204. The output packet 503 also contains a flag field 509 similar in function and capability to the earlier described flag field 405 of the packet 401 from the command decode controller 224. Using caching algorithms (such as Least Recently Used (LRU), Pseudo Least Recently Used (PLRU), or Most Recently Used (MRU)) along with a data aging (such as time stamps on the blocks of data) technique, the cache manager 260 can determine which blocks within the cache buffer 204 should be retained and which blocks should be removed or overwritten first. The cache manager is not limited to these specified caching algorithms nor is it required that the cache manager perform a caching algorithm to determine how to retain or overwrite data in embodiments of the invention.

Figure 6:
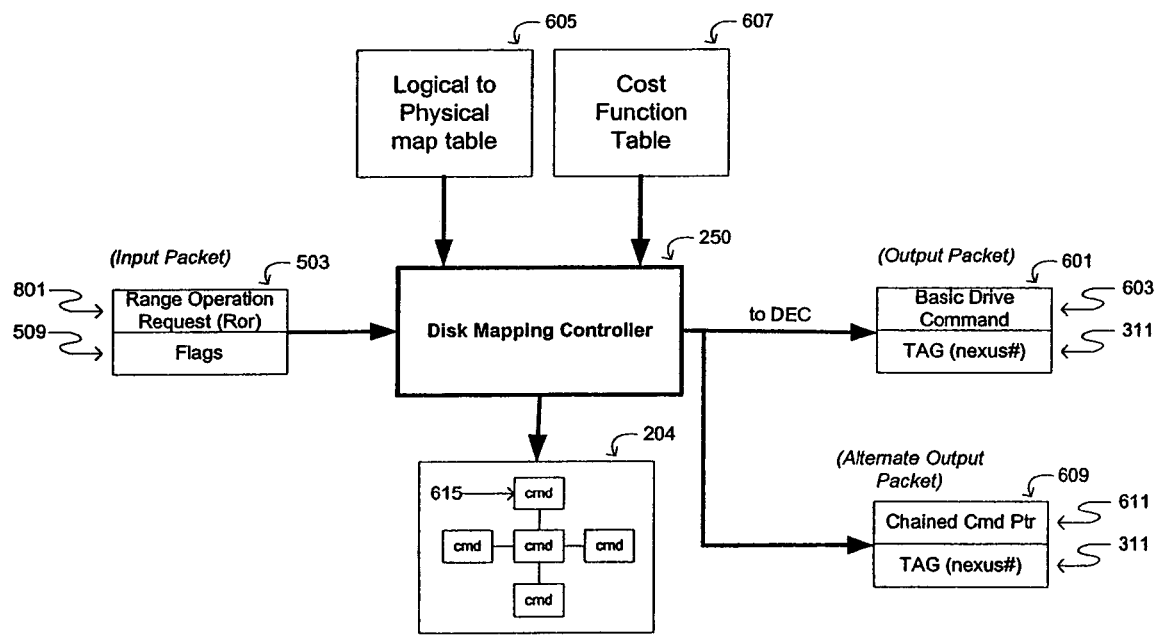
FIG. 6 is a process diagram of a Disk Mapping Controller of the present invention illustrating the input and output packets utilized by the Disk Mapping Controller.

Referring now to FIG. 6, a process diagram for the Disk Mapping Controller (DMC) 250 is illustrated. Generally, the disk mapping controller 250 converts requests for global logical block addresses (GLBAs) and maps them into physical block addresses. It is possible that a global logical block address can be mapped into more than one physical data block address when a redundant copy exists or data mirroring is utilized in a RAID controller application. If more than one source for the physical data block requested exists, the disk mapping controller 250 determines the best source of the data by evaluating a set of parameters and gathered statistics. These parameters and statistics are part of a cost function table 607 and can be used by the disk mapping controller to perform load balancing over the plurality of disk drives 103 of the disk array 102. In other embodiments of the present invention, the load balancing function need not be implemented. In a RAID controller application of the integrated I/O controller device 210, the disk mapping controller 250 implements in hardware and microcoded state-machines algorithms to provide RAID mapping of data blocks across the plurality of drives 103 of the disk array 102. RAID 0, RAID 1, RAID 0+1, RAID 5 and RAID 50 are all implemented and supported by the microcoded state-machine within the disk mapping controller 250. After calculating the required physical drive or drives to satisfy the Ror 801 of packet 503, the disk mapping controller 250 generates an output packet 601. The output packet 601 includes a Basic Drive Command 603 and the tag number 311 of the original host command requesting the data and is also referred to herein as a basic command packet 601. The disk mapping controller 250 generates output packets 601 which are sent to each of the Disk Exchange Controllers 232A-232N corresponding to each physical drive requiring access to satisfy the Ror of the input packet 503.

Alternatively, a linked list or a series of drive commands 615 can be formed, chained together and stored in a memory for later use when needed. The Cache Buffer memory 204 can be used to store this linked list of drive commands 615 as illustrated in FIG. 6. In case of the linked list of drive command 615, the disk mapping controller 250 sends a chained command packet 609 which includes a chained command pointer 611 and the tag number 311 to the disk exchange controllers 232A-232N. The chained command pointer 611 points to the list of drive commands 615 in the memory for processing by the Disk Exchange Controllers 232A-232N.

Figure 7:
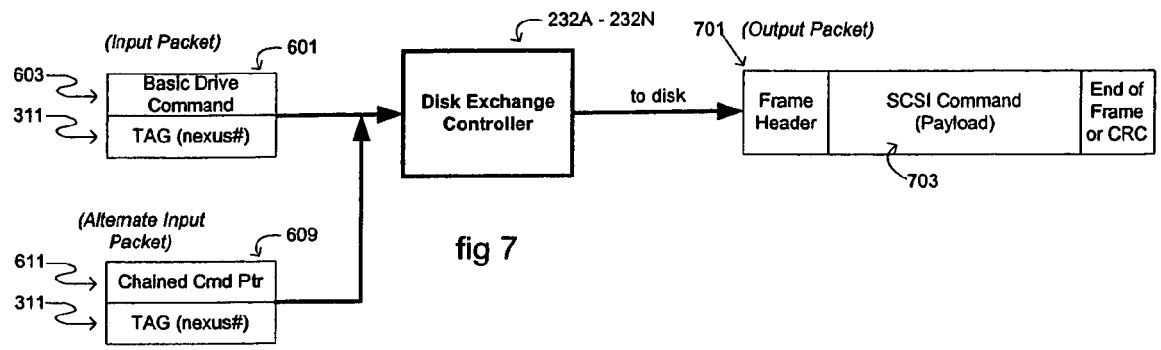
FIG. 7 is a process diagram of a Disk Exchange Controller of the present invention illustrating the input and output packets utilized by the Disk Exchange Controller.

FIG. 7 is a process diagram for each of the Disk Exchange Controllers (DEC) 232A-232N. Each disk exchange controller 232A-232N receives either a basic command packet 601 or alternatively a chained command packet 609 if chained commands are used. The basic command packet 601 includes the tag number 311 and a basic drive command 603. The chained command packet 609 includes the tag number 311 and the chained command pointer 611. If a disk exchange controller 232A-232N receives the basic command packet 601, it converts the basic drive commands 603 into SCSI command descriptor blocks (CDB) and then encapsulates them into an appropriate frame or output packet format 701 for transmission over the physical media connection interface 117 to the disks 103 of the disk array 102. If a disk exchange controller 232A-232N receives the chained command packet 609, it reads the chained command pointer accesses a stored command in a chain and converts it from a basic drive command into a SCSI command descriptor blocks (CDB) which is then encapsulated into an appropriate frame or output packet format 701.

In one embodiment, each disk exchange controller 232A-232N implements the defined protocol for a SCSI initiator as documented in the SCSI Architectural Model specification (SAM) which is further refined by the SCSI over Fibre Channel (FCP) and Private Loop Direct Attach (PLDA) standards specifications for Fibre Channel implementations in generating the peripheral command packet or frame 701. Similarly in embodiments of the invention supporting Ethernet (SCSI over Internet Protocol) and Infiniband, each disk exchange controller 232A-232N is microcoded to satisfy the requirements of these protocols and generate the appropriate peripheral command packet or frame 701. When data is transmitted from the cache buffer 204 to the plurality of disk drives 103 of the disk array 102 as opposed to commands, the disk exchange controller 232A-232N encapsulates the data with the appropriate frame or packet format for the physical media connection interface 117 utilized. When data is received from the plurality of disk drives 102 the disk exchange controller removes any data encapsulation information required by the physical media interface connection 117 and routes the data to the cache buffer 204. The buffer pointers 309, in the entry 313 specified by the tag number 311 associated with this operation, are utilized to specify the location in the cache buffer 204 to write the data.

Figure 9:
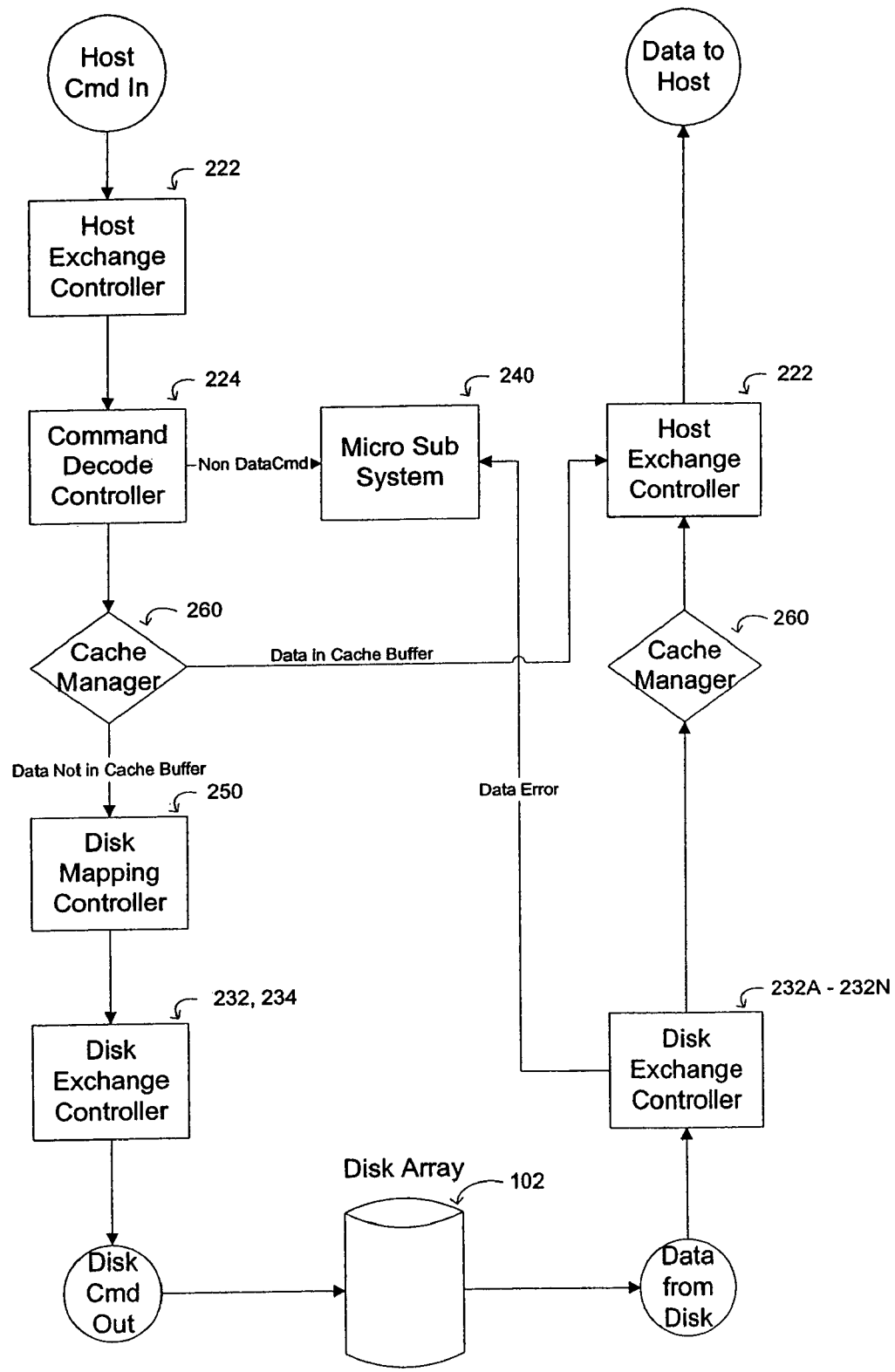
FIG. 9 is a command flow diagram showing a typical sequence of operation of a block read command.

Referring now to FIG. 9, a flow diagram showing the sequence of operations for processing a host read command is illustrated. A host command packet 301, including the host read command, is received by the host exchange controller 222 and stored in the host exchange table 303. The host exchange controller 222 then passes a tag number 311 in a tag packet 315 to the command decode controller 224 which indicates where the new SCSI CDB 307 is located in the host exchange table 303. The Command Decode Controller 224 extracts and processes the SCSI CDB 307 as previously explained in the description of FIG. 4. The command decode controller 224 then passes a packet 401 to the Cache Manager 260. The cache manager 260 operates on the packet 401 as previously explained in the description of FIG. 5. Any requested data not currently located in the cache buffer 204 is requested from the Disk Mapping controller 250 by the generation of a new packet 503 including a new Ror 801. The disk mapping controller 250 operates on the packet 503 as previously described in the description of FIG. 6 and passes the requests for data to one of the Disk Exchange Controllers 232A-232N by sending basic command packets 601 or the alternative chained command packet 609. The disk exchange controller 232A-232N receiving the command packet acts as a SCSI initiator and manages the sending of one or more disk commands to the plurality of disk drives 103 and then subsequently manages the transfer of data from the disks to the cache buffer 204. When all data has been received from the plurality of disk drives 103 of the disk array 102, the Cache Manager 260 updates the state of the blocks in the Cache State Table 501. The cache manager 260 then notifies the host exchange controller 222 that data is valid in the cache by sending the valid packet 505. Upon receipt of the valid packet 505, the host exchange controller 222 initiates the transfer of data from the location specified in the cache buffer 204 by the buffer pointers 309 listed in the entry 313 in the host exchange table 303 for this command, to the server specified in the network context information field 305 in the same entry 313.

Figure 10:
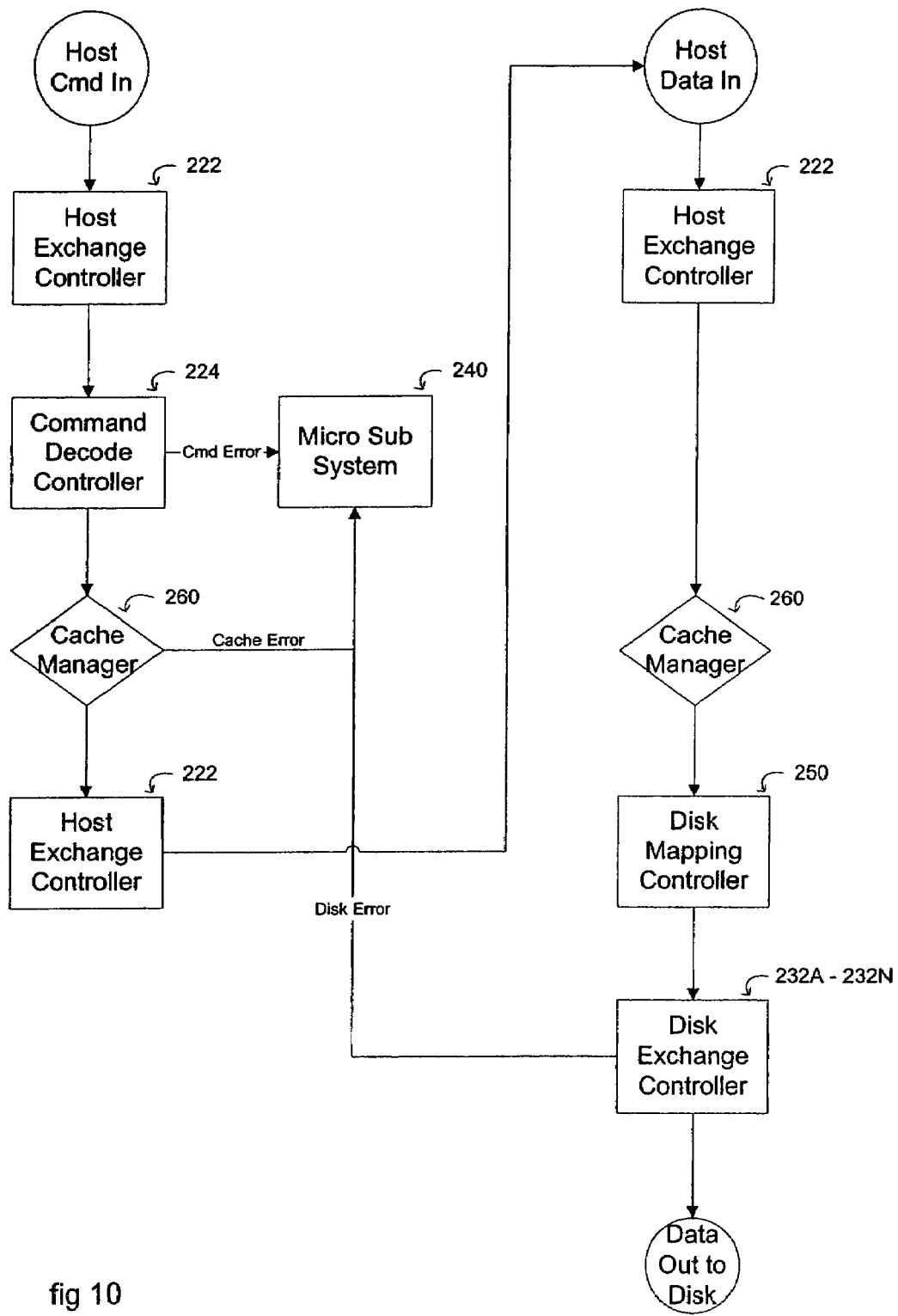
FIG. 10 is a command flow diagram showing a typical sequence of operation of a block write command.

Referring now to FIG. 10, a flow diagram showing the sequence of operations for processing a host write command is illustrated. A host command packet 301, including the host write command, is received by the Host exchange controller 222 and stored in the host exchange table 303. The host exchange controller 222 then passes a tag number 311 in a tag packet 315 to the command decode controller 224 which indicates where the new SCSI CDB 307 is located. The Command Decode Controller 224 extracts and processes the SCSI CDB 307 as previously explained in the description of FIG. 4. The command decode controller 224 then passes a packet 401 including Ror 801 to the Cache Manager 260. The cache manager 260 examines the Ror 801 of the packet 401 to determine how much buffer or storage space to allocate in the cache buffer 204 for processing the data. Once enough buffer space has been allocated to process the Ror 801, the cache manager 260 updates the buffer pointers 309 in the respective entry 313 in the host exchange table 303 as referenced by the tag number 311. The cache manager 260 then sends a valid packet 505 indicating that sufficient buffer space is available to receive data from the host. If write caching is disabled, these blocks of data will be immediately processed for transfer to the plurality of disk drives 103 of the disk array 102. The write operation proceeds by generating a new packet 503 to the Disk Mapping Controller 250 indicating the range of data to be written from the cache buffer 204. The disk mapping controller 250 operates on the packet 503 as previously explained in the description of FIG. 6 and passes the requests to write data to one of the Disk Exchange Controllers 232A-232N by sending basic command packets 601 or the alternative chained command packet 609. The disk exchange controller 232A-232N receiving the command packets acts as a SCSI initiator and manages the sending of one or more disk commands to the plurality of disk drives 103 and then subsequently the transfer of data from the cache buffer 204 to the disk drives 103 of the disk array 102. When all data has been transferred to the plurality of disk drives 103 of the disk array 102, the Cache Manager 260 updates the state of the blocks in the Cache State Table 501.

The present invention has many advantages over the prior art. One advantage of the present invention is that data communication rates are increased by integrating the I/O controller in hardware. Another advantage of the present invention is that data throughput is also increased by providing RAID mapping control in hardware. Still another advantage of the present invention is that the RAID mapping is flexible through programmability While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the integrated I/O controller has been described as interfacing to a disk array of a plurality of disks but can also interface to other storage devices or peripheral devices to provide I/O control. Additionally, it is possible to implement the present invention or some of its features in hardware, firmware, middleware, software or a combination thereof where one or more instructions are provided in a processor readable storage medium such as a magnetic, optical, or semiconductor storage medium.

What is claimed is:

1. An integrated I/O controller integrated into a single integrated circuit device for transceiving data as a plurality of data blocks between at least one host and a RAID disk array, comprising:

a host interface subsystem coupled to the at least one host for receiving host commands and transceiving said data blocks with the at least one host in response to the host commands via a host exchange controller, said host interface subsystem also including a command decode controller for parsing host commands to identify data flow type host commands and non data flow type commands, wherein said host exchange controller maintains a host exchange table comprising a plurality of table entries, receives a host command, and adds a new table entry to said host exchange table corresponding to said host command, each table entry being associated with a tag, and outputs the tag associated with the new table entry, and said command decode controller maintains a command queue comprising a plurality of queue entries, receives the tag associated with the new table entry, adds a new queue entry corresponding to said tag, and outputs a range operation request;

a micro-controller subsystem coupled to the host interface subsystem for processing non data flow type host commands;

a RAID mapping controller, separate from the micro-controller subsystem, coupled to the host interface subsystem, for mapping logical block addresses of the data flow type host commands into disk block addresses of a plurality of disks of the RAID disk array; and a disk interface subsystem, coupled to said plurality of disks of said RAID disk array for transceiving said data blocks with the plurality of disks using the disk block addresses generated by the RAID mapping controller;

wherein, for each data flow type host command, said command decode controller communicates an associated logical block address to the RAID mapping controller, said RAID mapping controller converts the associated logical block address to an associated disk block address, and said disk interface subsystem accesses the plurality of disks using said associated disk block address.

2. The integrated I/O controller of claim 1, wherein:

said host commands are high level I/O commands received from the at least one host;

said command decode controller includes circuits for parsing the high level I/O commands to determine whether to read or write data;

said RAID mapping controller includes circuits for mapping the high level I/O commands into one or more peripheral I/O commands, the one or more peripheral I/O commands indicating which of one or more peripherals and which respective data locations are to be accessed; and a peripheral interface subsystem which includes circuits for servicing the high level I/O commands by reading or writing data between the host and the one or more peripherals using the respective data locations.

3. The integrated I/O controller of claim 2, further including circuits for storing data temporarily into an external cache buffer from data flowing between the at least one host and the plurality of disks prior to servicing the high level I/O commands.

4. The integrated I/O controller of claim 2, wherein each of the one or more peripheral I/O commands further indicates the number of blocks of data to be serviced.

5. The integrated I/O controller of claim 2, wherein said RAID mapping controller includes circuits
for generating the one or more peripheral I/O commands in response to the range operation request.

6. The integrated I/O controller of claim 2, wherein each of the one or more peripheral I/O commands are Small Computer System Interface (SCSI) disk I/O commands.

7. The integrated I/O controller of claim 2, wherein the high level I/O commands are Small Computer System Interface (SCSI) Command Descriptor Blocks (CDB).

8. The integrated I/O controller of claim 2, wherein the circuits of the integrated I/O controller are hard wired circuits.

9. The integrated I/O controller of claim 2, wherein the circuits of the integrated I/O controller are microcoded circuits and state machines operating concurrently.

10. The integrated I/O controller of claim 2, wherein the circuits of the integrated I/O controller are hard wired circuits, microcoded circuits and state machines operating concurrently.

11. The integrated I/O controller of claim 2, wherein the circuits of the integrated I/O controller are programmable micro-controllers operating concurrently.

12. The integrated I/O controller of claim 1, further comprising: a cache manager coupled to the host interface subsystem and the disk interface subsystem for managing entries in a cache buffer to temporarily store data of data flowing between the plurality of disks and the at least one host.

13. The integrated I/O controller of claim 1, further comprising: a buffer manager coupled to the host interface subsystem, the disk interface subsystem, and the a cache manager, for managing data storage in a cache buffer.

14. The integrated I/O controller of claim 1, wherein the host exchange controller controls the physical connection and protocol of the at least one host.

15. The integrated I/O controller of claim 1, wherein the disk interface subsystem includes a disk exchange controller to control the physical connection and protocol of a disk.

16. The integrated I/O controller of claim 1, wherein the disk interface subsystem includes a Fibre channel disk port to transceive data with a disk using a Fibre channel protocol.

17. The integrated I/O controller of claim 1, wherein the micro-controller subsystem performs initialization and handles error and exception handling events.

18. The integrated I/O controller of claim 1, wherein the host interface subsystem includes a fibre channel host port to transceive data with the at least one host using a fibre channel protocol.

19. The integrated I/O controller of claim 1, wherein the command decode controller further validates a host command and initiates execution of the host command by the integrated I/O controller.

20. The integrated I/O controller of claim 1, wherein the command decode controller maintains a command queue for each volume accessible by the at least one host to further validate a host command and to queue the host command for execution.

21. The integrated I/O controller of claim 1, wherein the command decode controller further validates a host command and, if the host command is determined to be invalid, the host command is passed to a micro-controller subsystem for processing as a non data flow command.

22. The integrated I/O controller of claim 1, wherein the host commands are high level input/output requests.

23. The integrated I/O controller of claim 15, wherein one or more disks of the RAID disk array are magnetic storage media, optical storage media or semiconductor storage media.

24. The integrated I/O controller of claim 1, wherein the disk interface subsystem includes one or more fibre channel disk ports to transceive data with the one or more disks of the RAID disk array using a fibre channel protocol.

25. The integrated I/O controller of claim 1, wherein the RAID mapping controller is programmable hardware to flexibly control the mapping of blocks of data storage on the plurality of disks of the RAID disk array.

26. The integrated I/O controller of claim 25, wherein the RAID mapping controller receives a requested command input packet to generate expanded command output packets in response thereto, the requested command input packet including a logical address and the expanded command output packets including physical addresses.

27. The integrated I/O controller of claim 25, further comprising a buffer manager and a cache manager, the buffer manager and the cache manager being coupled, respectively, to a cache buffer and a cache table buffer, for flexibly controlling the reading and writing of data to and from the mapped data storage on the one or more disks of the RAID disk array.

28. The integrated I/O controller of claim 1, wherein the RAID mapping controller comprises:
a mapping engine to map high level host I/O requests into low level I/O commands; and
a low level command manager to manage data read and data write accesses into and out of a disk in response to the low level I/O commands.

29. The integrated I/O controller of claim 1, further comprising a buffer manager to arbitrate access by the at least one host and to control data reads and data writes into and out of a buffer memory.

30. The integrated I/O controller of claim 1, wherein the micro-controller subsystem handles system initialization and error handling exception conditions.

31. The integrated I/O controller of claim 1, wherein the data flow type host commands comprise read and write commands.

32. The integrated I/O controller of claim 1, further comprising a cache manager for communicating with a cache memory.

33. The integrated I/O controller of claim 32, wherein said cache manager determines whether data corresponding to said associated logical block address is stored in the cache memory before said command decode controller communicates said associated logical block address to said RAID mapping controller, and if data corresponding to said logical block address is stored in the cache memory, said host command is processed using said cache memory and said command decode controller does not communicate said associated logical block address to said RAID mapping controller.

34. The integrated I/O controller of claim 1, wherein said disk interface subsystem also transceives at least one additional block when said disk interface subsystem transceives said plurality of data blocks with said plurality of disks.

35. The integrated I/O controller of claim 34, wherein said at least one additional block comprises parity information regarding at least said plurality of data blocks.

36. The integrated I/O controller of claim 35, wherein said at least one additional block comprises a copy of said plurality of data blocks.

37. The integrated I/O controller of claim 1, wherein said RAID mapping controller converts the associated logical block address to an associated disk block address in accordance with a mapping which stripes data across said plurality of disks.

38. The integrated I/O controller of claim 1, wherein said RAID mapping controller converts the associated logical block address to an associated disk block address in accordance with a mapping which mirrors data across said plurality of disks.

39. The integrated I/O controller of claim 1, wherein said RAID mapping controller converts the associated logical block address to an associated disk block address in accordance with a mapping which mirrors and stripes data across said plurality of disks.

40. The integrated I/O controller of claim 1, wherein said disk interface subsystem comprises a SCSI initiator.

41. The integrated I/O controller of claim 1, wherein said disk array is organized as a plurality of logical volumes and said integrated I/O controller independently processes commands directed said plurality of logical volumes.

* * * * *